US007073461B2

(12) United States Patent
Gonet

(10) Patent No.: US 7,073,461 B2
(45) Date of Patent: Jul. 11, 2006

(54) PET DISH

(76) Inventor: Cindy Gonet, Dyke Lane 18, South Dartmouth, MA (US) 02748

( * ) Notice: Subject to any disclaimer, the term of this patent is extended or adjusted under 35 U.S.C. 154(b) by 0 days.

(21) Appl. No.: 10/918,198

(22) Filed: Aug. 13, 2004

(65) Prior Publication Data

US 2006/0032451 A1    Feb. 16, 2006

(51) Int. Cl.
*A01K 5/02* (2006.01)
(52) U.S. Cl. ..................... 119/61.5; 119/51.5
(58) Field of Classification Search ........... 119/51.5, 119/61.5, 61.52, 61.53, 61.54, 62, 63, 51.02
See application file for complete search history.

(56) References Cited

U.S. PATENT DOCUMENTS

| 3,137,272 | A | * | 6/1964 | Lepper | 119/51.12 |
| 3,176,656 | A | * | 4/1965 | Bates | 119/62 |
| 3,785,348 | A | * | 1/1974 | Polidori, Sr. et al. | 119/62 |
| 4,164,200 | A | * | 8/1979 | Gambling | 119/51.12 |
| 4,473,031 | A | * | 9/1984 | Bobeczko | 119/51.12 |
| 6,349,671 | B1 | * | 2/2002 | Lewis et al. | 119/51.02 |

* cited by examiner

Primary Examiner—Robert P. Swiatek
(74) Attorney, Agent, or Firm—James V. Costigan; Hedman & Costigan, P.C.

(57) ABSTRACT

A pet dish, equipped with a lid that opens so that food is made available only when the pet goes near the dish, and shuts once the pet moves away.

10 Claims, 3 Drawing Sheets

PET DISH

FIELD OF THE INVENTION

The invention disclosed herein relates to an improved domestic animal feed dish.

STATE OF THE ART

Currently several models of domestic animal feed dishes with lids are known. The problem of maintaining pet food fresh and prevent also the emanation of bad odors, is in fact often faced by pet owners. In fact in today's society the number of people who choose to keep a pet is continually increasing, and increasing just as fast is the necessity of spending a lot of time outside of the home.

During prolonged absences, but still having to leave an adequate quantity of food and water at the disposal of a pet, until recent times common pet dishes could be filled up before absenting oneself. Thus risking to find, at one's return, the house invaded by bad odors and ants. This, without considering the diet given to one's own pet, which in the first hours after one's absence, is assured of a great quantity of fresh food and water, that become however completely unsatisfactory at the next meal, both for quality and quantity. In fact, it is always more often that pet owners absent themselves for entire weekends and even if a pet dish is large, a common pet dish is generally not sufficient to guarantee sufficient food and water until the return of the pet owner. These absences from home are more frequent in the summer months, when the temperature makes the problem more acute: that of maintaining food fresh for long periods and preventing bad odors.

Several attempts at addressing these needs have been made; an example is the dish with a timed opening, recently on the market and specifically for feeding dogs and cats. This dish, available in several versions, with a number of compartments which vary according to the number of days the pet owner will be absent, is supplied with a lid for each compartment the opening of which is regulating by a timer, which the pet owner can program before his absence. Thanks to the timer, the dish should remain exposed only during the meals of the pet, thus maintaining food fresh and preventing bad odors. However, the use of this apparatus shows its inefficiency. Even if the pet owner knows the eating hours of his pet, the regulation of the timer reveals the weak spot of these apparatus that, if on one hand they maintain food fresh, on the other, they are not adapted to the habits of the pet.

For the above reasons, it would be advantageous therefor to have at one's disposal a dish for pet food, equipped with a lid that opens only when necessary, which is when the pet goes near to eat, and shuts when the pet moves away.

SUMMARY OF THE INVENTION

The Applicant has now found an innovative pet dish, equipped with an 'intelligent' lid that opens only when the pet approaches the dish and closes when the pet, having finished eating, moves away.

The pet dish is an optimum solution for the problems explained above, connected to feeding domestic animals especially during prolonged absence of the pet owner, and is adaptable to the habits of the pet, therefor resolving the inconveniences of dishes with timers presently on the market.

DETAILED DESCRIPTION OF THE INVENTION

Figure 1A:
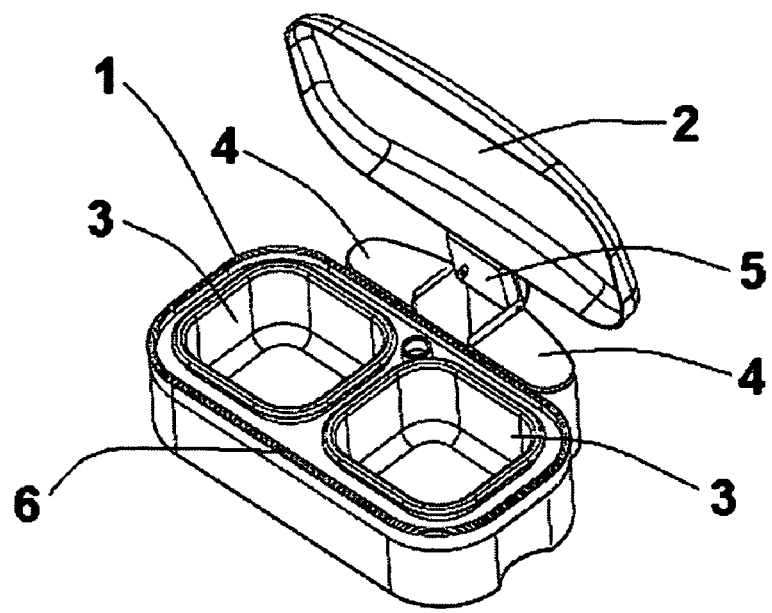
FIGS. 1A and 1B: show two top views in perspective of the dish in accordance with the invention, respectively with the lid in the "open" position and in the "shut" position.
Figure 1B:
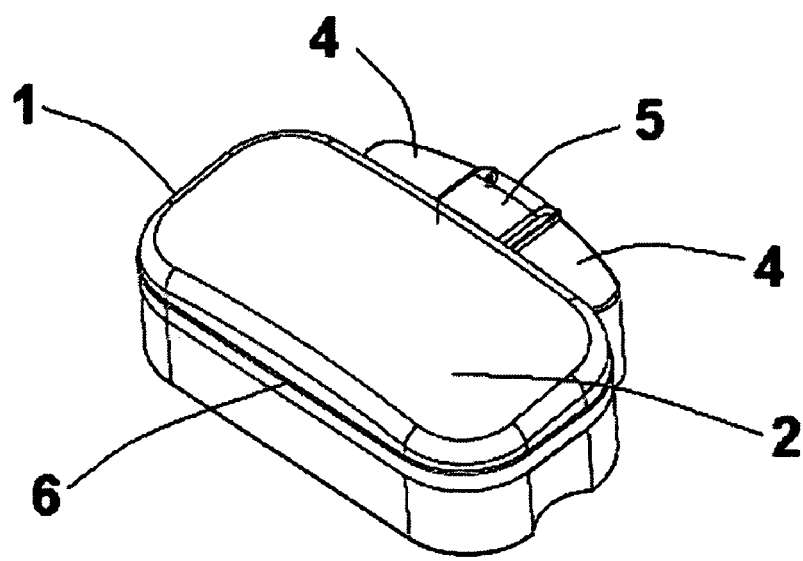
Figure 2:
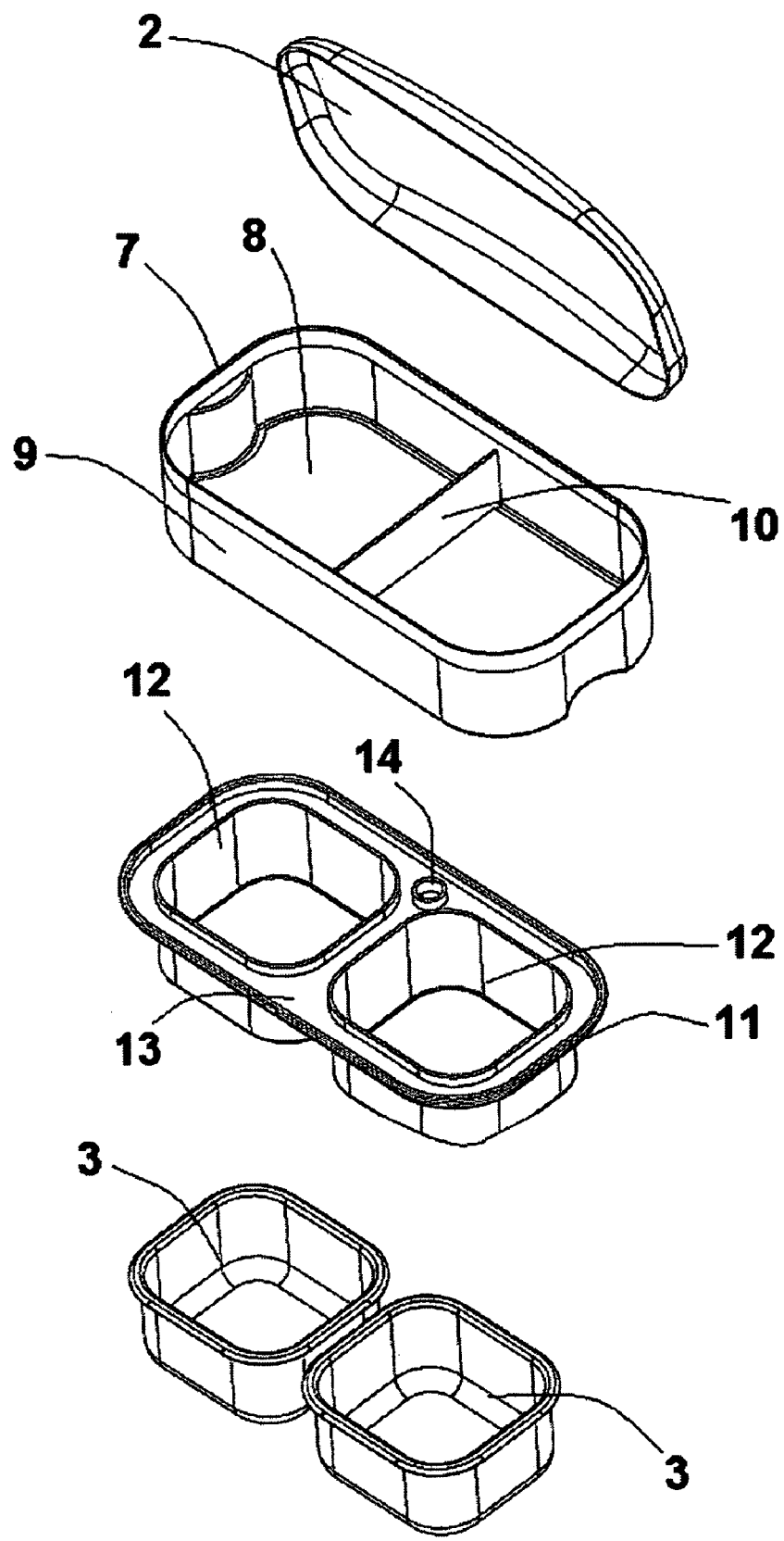
FIG. 2: shows the main structural components of the dish: that is, tray, separator dish-holder, internal dishes and lid.
Figure 3:
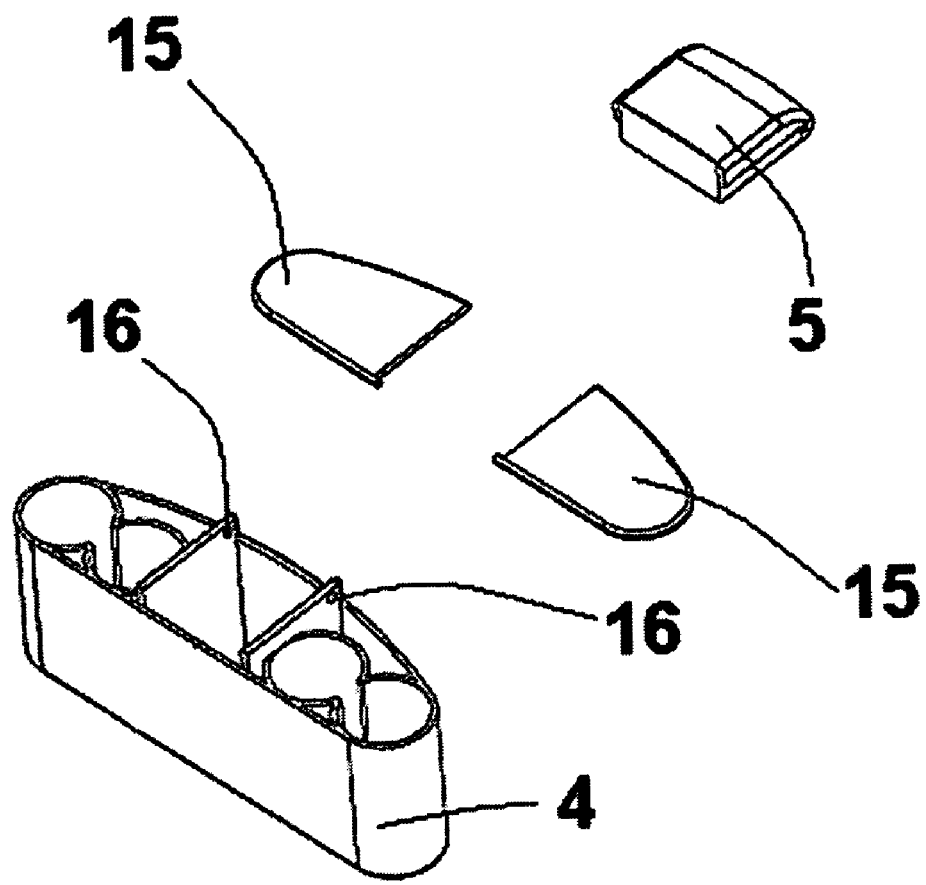
FIG. 3: shows an exploded view of the container battery-holder.

The FIGS. 1–3 described above are reported as a non limiting illustration of the invention. With reference to these FIGS. 1A, 1B, 2 and 3 above briefly illustrated, herein below follows a detailed description of the pet dish of the invention, its characteristics and the advantages compared to prior art.

In FIGS. 1A and 1B the dish (1) of the invention is shown respectively with the lid (2) in two positions 'open' and 'shut'. In these two Figures, besides the lid (2) can be discerned the internal dishes (3) intended to contain food or water, the container battery-holder (4), the hinge (5) linking said lid to said container, and the infrared sensor (6).

In FIG. 2 are shown the main structural components of the dish of the invention: the lid (2), the external tray (7) and the internal dishes (3). A preferred embodiment comprises also a dish-holder (11) which is positioned on the tray (7) and in which are positioned the internal dishes (3).

The dish (1) is equipped with an infrared sensor (6) positioned on the front portion, for example and infrared Light Emitting Diode, that reveals the presence of the pet in front of the dish and sends a signal to the circuit contained inside the dish, typically inside the battery-holder container (4) or inside the tray (7). Preferably a Surface Mount Technology miniturized electronic circuit that, thanks to its reduced dimensions, can be positioned inside the container (4) or the tray (7). Such a circuit, having received the signal from the infrared sensor, gives the command to a mechanical actuator, for example a motor, to operate astaff, or any other appropriate means, fixed to the lid (2) by way of hinge (5). At this point, the lid (2) opens and remains in such a position that it forms about a 90° angle with the dish, and continues until the pet moves away, then the signal coming from the infrared sensor (6) ceases.

Both the electronic circuit and the infrared sensor (6) are powered by the batteries positioned in the container battery-holder (4). An on-off switch is preferably positioned between the circuit and the sensor and the batteries, and can be operated by way of a button external to the dish, so that batteries are not used when the dish is not in use.

The container battery-holder (4) is preferably equipped with a removable lid that allows battery change.

The lid (2) has a form and dimensions proportional to those of the tray (7), that has a form and dimensions adapted to hold the separator dish-holder (11) which is shaped for holding the internal dishes (3).

The tray (7) is formed from a flat base (8) and borders (9) that rise along the perimeter of said base (8); one or more separating walls (10) divide the internal space of the tray (7) to create the space allotted to the internal dishes (3) and serve as a support for the dish-holder (11). FIGS. 1–3 illustrate a particular embodiment of the present dish, comprising only two internal dishes, but it is understood included in the scope of the invention also dishes with only one internal dish or with more than two internal dishes, comprising respectively a tray without a separator (10) or a tray with more than one separator.

In FIG. 2 is shown in detail the separator dish-holder (11) formed with two depressions (12) with or without a bottom adapted to hold the internal dishes (3) united by a flat border (13) that surrounds said depressions; the internal and external outlines of said border (13) are raised so as to create a groove all around the depressions where the internal dishes are positioned. Such a groove can be used, for example, to keep away ants and other insects from the dishes with food, simply filling them up with water. On the border (13) can be created a hollow cavity (14) useful for containing sand or other inert materials, to maintain the dish heavy-weight and prevent its tipping-over.

The separator dish-holder (11) has also the function of maintaining the internal dishes (3) raised up from the base (8) of the tray (7), leaving between said base and said internal dishes sufficient space to contain, for example, freezer ice normally used in freezer bags or other refrigerator means. Such a device is in fact useful to maintain food fresh even longer.

Still in FIG. 2 are represented the two internal dishes (3) formed to be positioned in the depressions (12) of the separator dish-holder (11); internal dishes particularly advantageous as they have an external border that rests on the separator and impedes the fall of food inside the dish itself or inside the base of the tray.

In FIG. 3 is shown an exploded view of the container battery-holder (4) in which can be discerned the cavities to hold the batteries and the covers (15) of said container. In the holes (16) of the container (4) there are the lateral protuberances of the hinge (5) so that between the base of the dish and the lid (2) a hinging link is made, for opening and closing the same lid.

All of the main components of the structure of the dish, which are the tray (7), lid (2) separator (11) and internal dishes (3) are preferably made of rigid plastic, for example, polypropylene, so that they can easily be cleaned with soap and water.

The present dish, as above described, is particularly suitable for feeding cats and small dogs, even if by varying the number and sizes of the internal dishes, it could be adapted also to the necessities of other domestic animals.

The use of the present dish allows keeping food fresh even for several days, so as to guarantee satisfactory feeding of the pet even during prolonged absences of the pet owner, and avoiding bad odors and an impediment to ants and other insects.

The invention claimed is:

1. A dish for domestic animals, comprising a tray (7), at least one internal dish (3) to contain food and to be positioned inside said tray, a lid (2) of shape and dimensions proportional to cover said tray, a hinge (5) to raise said lid, an electronic circuit powered by batteries, a mechanical actuator and an infrared sensor (6) positioned on the front portion of said dish and also powered by said batteries, that signals the presence of the pet near the dish and sends said signal to said circuit that, having received the signal from the infrared sensor, gives the command to the mechanical actuator to operate an appropriate hinged staff with said lid (2) by way of said hinge (5) to raise said lid to an open position, opening said lid up to an approximate 90° angle with the base of the tray and keeping it in said open position until when the pet moves away, the signal from the infrared sensor (6) ceases.

2. The dish according to claim 1, further comprising a separator dish-holder (11) to be placed in said tray (7) and in which can be placed one or more internal dishes (3).

3. The dish according to claim 2, in which said tray (7) is formed from a flat base (8), from borders (9) that raise up along the perimeter of said base (8), and from one or more separators (10) dividing the internal space of the tray (7) to create the spaces for said one or more internal dishes (3) and function as holder for said separator dish-holder (11).

4. The dish according to claim 2, in which said separator dish-holder (11) is formed of one or more depressions (12) adapted to hold said one or more internal dishes (3), keeping them raised up from the tray (7), and a flat border (13) that surrounds said depressions, the internal and external edges of said border being raised up so as to create a groove all around said depressions where said one or more internal dishes are positioned.

5. The dish according to claim 2, in which said separator dish-holder (11) comprises also a hollow cavity (14) useful to contain inert materials, sand, or other weights.

6. The dish according to claim 1, in which said infrared sensor is an infrared light emitting diode.

7. The dish according to claim 1, further comprising a container battery-holder (4) in which are contained said batteries.

8. The dish according to claim 7, in which said electronic circuit is comprised of a miniaturized circuit in surface mount technology positioned inside said battery-holder (4) or said tray (7).

9. The dish according to claim 1, in which said mechanical actuator is a motor capable of operating said appropriate hinged staff with the lid (2) by way of said hinge (5).

10. The dish according to claim 1, further comprising an on/off switch positioned between said circuit and said sensor and batteries, and operated by an on/off button positioned externally to the dish.

* * * * *